US012416720B2

(12) United States Patent
Tapia et al.

(10) Patent No.: US 12,416,720 B2
(45) Date of Patent: Sep. 16, 2025

(54) SCINTILLATION-BASED NEURAL NETWORK FOR RADAR TARGET CLASSIFICATION

(71) Applicant: GM CRUISE HOLDINGS LLC, San Francisco, CA (US)

(72) Inventors: Daniel Flores Tapia, Fairfield, CA (US); Kotung Lin, San Carlos, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 552 days.

(21) Appl. No.: 17/964,208

(22) Filed: Oct. 12, 2022

(65) Prior Publication Data

US 2024/0125919 A1 Apr. 18, 2024

(51) Int. Cl.
*G01S 13/89* (2006.01)
*G01S 7/02* (2006.01)
*G01S 13/931* (2020.01)
*G06N 3/047* (2023.01)

(52) U.S. Cl.
CPC ............. *G01S 13/89* (2013.01); *G01S 7/02* (2013.01); *G01S 13/931* (2013.01); *G06N 3/047* (2023.01)

(58) Field of Classification Search
CPC ........ G01S 13/89; G01S 13/931; G01S 13/86; G01S 13/584; G01S 13/343; G01S 7/417; G01S 7/412; G01S 7/02; G01S 7/003
See application file for complete search history.

(56) References Cited

U.S. PATENT DOCUMENTS

| 11,698,437 B2 * | 7/2023 | Gerardo Castro .... G01S 13/726 382/158 |
| 2016/0238695 A1 * | 8/2016 | Theurer ................ G01S 13/958 |
| 2018/0106889 A1 * | 4/2018 | Schuck ................ G01S 13/886 |
| 2018/0172825 A1 * | 6/2018 | Hsu ........................ G01S 7/411 |
| 2020/0142029 A1 * | 5/2020 | Brooker ................. G01S 13/56 |
| 2020/0271756 A1 * | 8/2020 | Novoselsky ............ G01S 7/417 |
| 2021/0173043 A1 * | 6/2021 | Lang ..................... G01S 13/723 |
| 2022/0026568 A1 * | 1/2022 | Meuter ..................... G01S 7/41 |
| 2023/0236317 A1 * | 7/2023 | Fina ........................ G01S 7/412 342/26 B |

* cited by examiner

*Primary Examiner* — Peter M Bythrow
(74) *Attorney, Agent, or Firm* — CANTOR COLBURN LLP

(57) ABSTRACT

Disclosed are systems and methods for scintillation-based neural network for RADAR target classification. In some aspects, a method includes generating a point cloud from radio frequency (RF) scene responses received from a radio detection and ranging (RADAR) sensor for a scanned scene; populating a rolling buffer with frame data from the point cloud, the frame data including radar cross section (RCS) values, RCS scintillation measurements, and velocity values for objects in the scanned scene; inputting the RCS scintillation measurements and velocity values for an object of the objects to a convolutional neural network (CNN); and receiving a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

20 Claims, 8 Drawing Sheets

500

---

Receive, at a scintillation-based convolutional neural network (CNN), radar cross section (RCS) scintillation measurements and velocity values for an object in a scanned region of a RADAR sensor
510

↓

Generate, at a first stage of the CNN, a probability density function (PDF) estimate of the RCS scintillation measurements for the object in the scanned region
520

↓

Perform, at a second stage of the CNN, a Neyman Pearson evaluation of the PDF estimate for the object to determine fits with reference PDFs from a PDF dictionary utilized by the CNN, where the Neyman Pearson evaluation is to further utilize the velocity values to determine the fits
530

↓

Classify, at a third stage of the CNN, the object based on an assessment of the determined fits from the second stage of the CNN, where the object is classified as one of a target of interest, a highly-reflective structure, a clutter surface, or sensor noise
540

*FIG. 5*

SCINTILLATION-BASED NEURAL NETWORK FOR RADAR TARGET CLASSIFICATION

BACKGROUND

1. Technical Field

The disclosure generally relates to the field of processing systems and, more specifically, to scintillation-based neural network for RADAR target classification.

2. Introduction

Autonomous vehicles, also known as self-driving cars, driverless vehicles, and robotic vehicles, may be vehicles that use multiple sensors to sense the environment and move without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Current automotive RADAR sensors can operate in urban environments. The urban environments can produce perception obstacles for the RADAR sensors, such as low reflectivity, critical scene actors (such as pedestrians), and increased levels of environmental clutter. These elements in the automotive RADAR sensor environment can make the classification of automotive RADAR target signatures a challenge.

BRIEF DESCRIPTION OF THE DRAWINGS

The various advantages and features of the disclosed technology will become apparent by reference to specific implementations illustrated in the appended drawings. A person of ordinary skill in the art will understand that these drawings only show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 5 illustrates an example method for RADAR target classification by a scintillation-based CNN, in accordance with embodiments herein;

DETAILED DESCRIPTION

Figure 1:
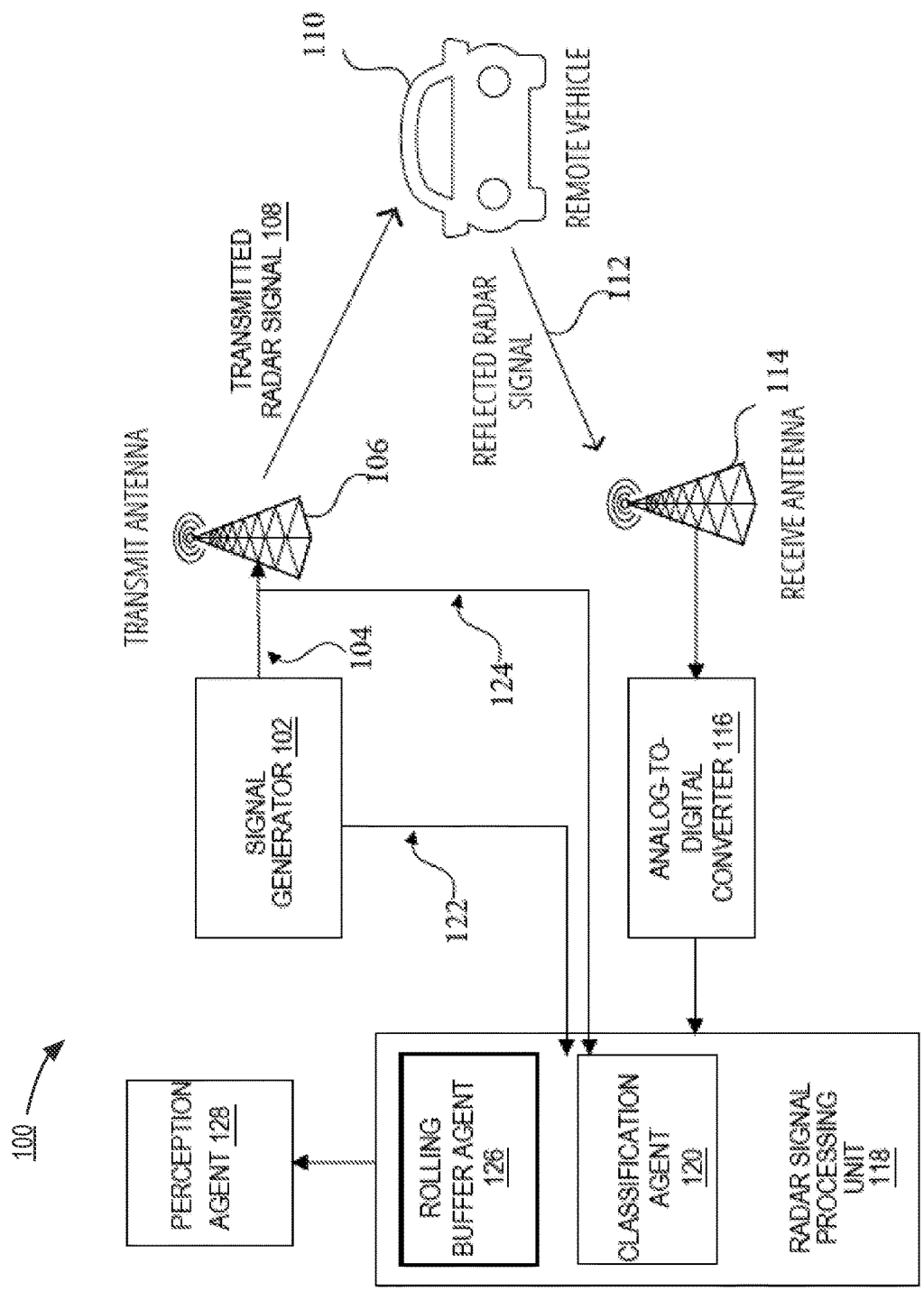
FIG. 1 is a block diagram of an example automotive radio detection and ranging (RADAR) system illustrating transmit and receive capability, in accordance with an embodiment herein.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-haling (e.g., ridesharing) services. The AV can navigate about roadways without a human driver based upon sensor signals output by sensor systems deployed on the AV. AVs may utilize multiple sensors to sense the environment and move without a human driver. An exemplary AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Current automotive RADAR sensors often operate in urban environments. These urban environments can present perception obstacles for the RADAR sensors, such as low reflectivity, critical scene actors (such as pedestrians), and increased levels of environmental clutter. These elements in the environment make the classification of automotive RADAR target signatures a challenge. Some root causes for the challenges with classification include overlapping radar cross section (RCS) values, velocity artifacts, and/or high sensor floor noise levels.

With respect to overlapping RCS values, due to the relative areas of critical scene actors and road infrastructure, asphalt surface responses usually have RCS values within similar magnitude ranges. Although some clutter mitigation algorithms are currently used in automotive RADARs today, these methods are optimized for asphalt surfaces in low grade scenarios, limiting their more general use.

With respect to velocity artifacts, current RADAR perception classification algorithms make extensive use of velocity features to classify objects in the scan area. Although these techniques are useful, they are prone to generate false positives based on the sensor signal processing limitations (such as velocity ambiguity effects) and physical clutter effects (such as false velocity peaks from asphalt surfaces).

With respect to high sensor floor noise levels, current commercial RADAR integrated circuits (ICs) are based on complimentary metal-oxide semiconductor (CMOS) technology. This architectural approach results in cost effective and small-packaged chipsets. However, the noise figure associated with this approach is quite high, resulting in relatively large floor noise levels that can make the detection of small targets difficult.

Embodiments herein address the above-described technical problems by providing a scintillation-based neural network for RADAR target classification. In one embodiment, the neural network can be a convolutional neural network (CNN). The CNN approach of embodiments herein implements a CNN in the RADAR perception classification algorithm, where the CNN utilizes a histogram of RCS scintillation values that are calculated and classified using a Neyman-Pearson criteria evaluation. Embodiments of the CNN use the scintillation (also referred to herein as RCS scintillation) of target signatures (e.g., RCS) of objects captured by the RADAR sensor to classify them as targets of interest, highly reflective structures, clutter, or thermal noise, for example.

Due to the structural nature of the objects of interest, the sensor responses from the objects can be significantly different from the responses from asphalt or floor noise. For example, pedestrians have an RCS distribution that resembles a Chi square with 2 degrees of freedom, static objects (such as posts or hydrants) have an RCS distribution that resembles Chi square distribution with no degrees of freedom, clutter has an RCS distribution that resembles Weibull style distributions, and thermal noise has an RCS distribution that follows a Gaussian distribution. The CNN of embodiments herein further provides additional safeguards by incorporating the signature velocity of the objects captured by the RADAR sensor in order to compensate for scintillation effects due to motion (such as false positives exhibited by asphalt surfaces).

Although some embodiments herein are described as operating in a RADAR sensor implemented in an AV, other embodiments may be implemented in a RADAR sensor operating in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. The following description discussed embodiments as implemented in an automotive environment, but one skilled in the art will appreciate that embodiments may be implemented in a variety of different RADAR environments and use cases. Further details of the scintillation-based neural network for RADAR target classification of embodiments herein are further described below with respect to FIGS. 1-8.

FIG. 1 a block diagram of an example automotive RADAR system 100 illustrating transmit and receive capability. In one embodiment, automotive RADAR system 100 implements a scintillation-based neural network for RADAR target classification, as described further herein. The automotive RADAR system 100 of FIG. 1 can be, for example, one of sensor systems in an AV. In other examples, the automotive RADAR system 100 can be part of a human-operated vehicle having an advanced driver assistance system (ADAS) that can utilize various sensors including radar sensors.

Signal generator 102 can be, for example, a frequency-modulated continuous wave (FMCW) generator that produces a series of chirps, which are sinusoid signals have frequencies that sweep from a pre-selected minimum frequency to a pre-selected maximum frequency to be transmitted from, for example, a host platform (e.g., AV, human operated ADAS vehicle, automated delivery vehicle). Other signal types (e.g., non-FMCW) can also be supported.

The signal generated by signal generator 102 provides a radar frequency signal (e.g., generated RADAR waveform 104) to be transmitted by transmit antenna 106 (which can be a single antenna or an antenna array) as transmitted RADAR signal 108. Transmitted RADAR signal 108 can be reflected by a remote object, for example, remote vehicle 110. Reflected radar signal 112 is detected by receive antenna 114, which can be a single antenna or an antenna array. The received reflected radar signal 112 from receive antenna 114 can be digitized by analog-to-digital converter 116 to generate digital RADAR waveforms that are transmitted to RADAR signal processing unit 118.

In an example, RADAR signal processing unit 118 includes classification agent 120 and rolling buffer agent 126, which can provide the scintillation-based neural network for RADAR target classification functionality described herein. The rolling buffer agent 126 maintains a data store including a buffer data structure that stores one or more frames of RADAR data corresponding to captured scene data from the RADAR sensor. The frames of RADAR data may include, but are not limited to, a histogram of RCS values corresponding to objects in the captured scene data, as well as velocity values corresponding to the objects. RCS, also referred to as RADAR signature, is a measure of how detectable an object (or target) is by a radar. A large RCS indicates that an object is more easily detected, and vice versa. RCS is a property of the target's (object's) reflectivity. A target's RCS depends on its size, reflectivity of its surface, and the directivity of the radar reflection caused by the target's geometric shape. The size of a target's image on radar is measured by the RCS, often represented by the symbol $\sigma$ and expressed in square meters ($m^2$).

The classification agent 120 can provide a scintillation-based CNN that utilizes the RADAR data stored in the rolling buffer maintained by the rolling buffer agent 126. For each object detected in the scene captured by the RADAR sensor, CNN can utilize scintillation values corresponding to the RCS values (also referred to herein as RCS scintillation measurements herein) to generate a probability density function (PDF) estimate of the RCS scintillation measurements. PDF, or density, of a continuous random variable, is a function whose value at any given sample (or point) in the sample space (the set of possible values taken by the random variable) can be interpreted as providing a relative likelihood that the value of the random variable would be close to that sample. RCS scintillation refers to a fluctuation in the amplitude of the RCS measurement of a target object of the RADAR sensor. RCS scintillation can be caused by a shift of the effective reflection point on the target, but has other causes as well. The fluctuations can be slow (scan-to-scan) or rapid (pulse-to-pulse), for example.

The scintillation-based CNN implemented by the classification agent 120 may then determine best fits of the PDF estimate with one or more reference PDFs of a PDF dictionary corresponding to the RADAR sensor. In one embodiment, the CNN of the classification agent 120 utilizes a Neyman-Pearson evaluation to determine the best fits with the reference PDFs. The Neyman-Pearson evaluation is a test to determine if a hypothesis test being used is the one with the greatest statistical power. The power of a hypothesis test is the probability that the test correctly rejects the null hypothesis when the alternate hypothesis is true. The goal would be to maximize this power, so that the null hypothesis is rejected as much as possible when the alternate is true. The CNN may further utilize the velocity values corresponding to the objects in determining its best fits.

Then, the CNN of the classification agent 120 determines a classification for the object based on the determined fits. The classifications may include targets of interest, highly reflective structures, clutter, or thermal noise, for example.

The CNN of the classification agent 120 of embodiments herein provides for enhanced discrimination, as the basic features used for classification is based on physics-based first principles. As such, embodiments herein may provide a higher level of discrimination between objects of interest and environmental clutter. Furthermore, embodiments herein provide for contrast improvement as the CNN is using RCS scintillation instead of raw RCS values. As such, the CNN is capable of detecting low RCS targets in cluttered environments. This is of particular interest as several critical objects, such as small children, have RCS values within the same RCS magnitude as street surfaces and are closer to the floor noise levels of the sensor.

In embodiments herein, the scintillation-based CNN of the classification agent 120 also provides resilience against motion artifacts. This is due to the joint use of the RCS scintillation and velocity metrics for the object signatures in the scene. The embodiments described herein provide an additional level of resilience compared to current classification approaches that use velocity metrics. Furthermore, by using both velocity and RCS scintillation as the input metrics, the scintillation-based CNN described herein is capable of effectively eliminating velocity artifacts and compensate for the velocity effects on the object's scintillation.

Further details of the techniques discussed above for scintillation-based neural network for RADAR target classification that are implemented by the RADAR signal processing unit 118 are described in greater detail below with respect to FIGS. 2-5.

Figure 2:
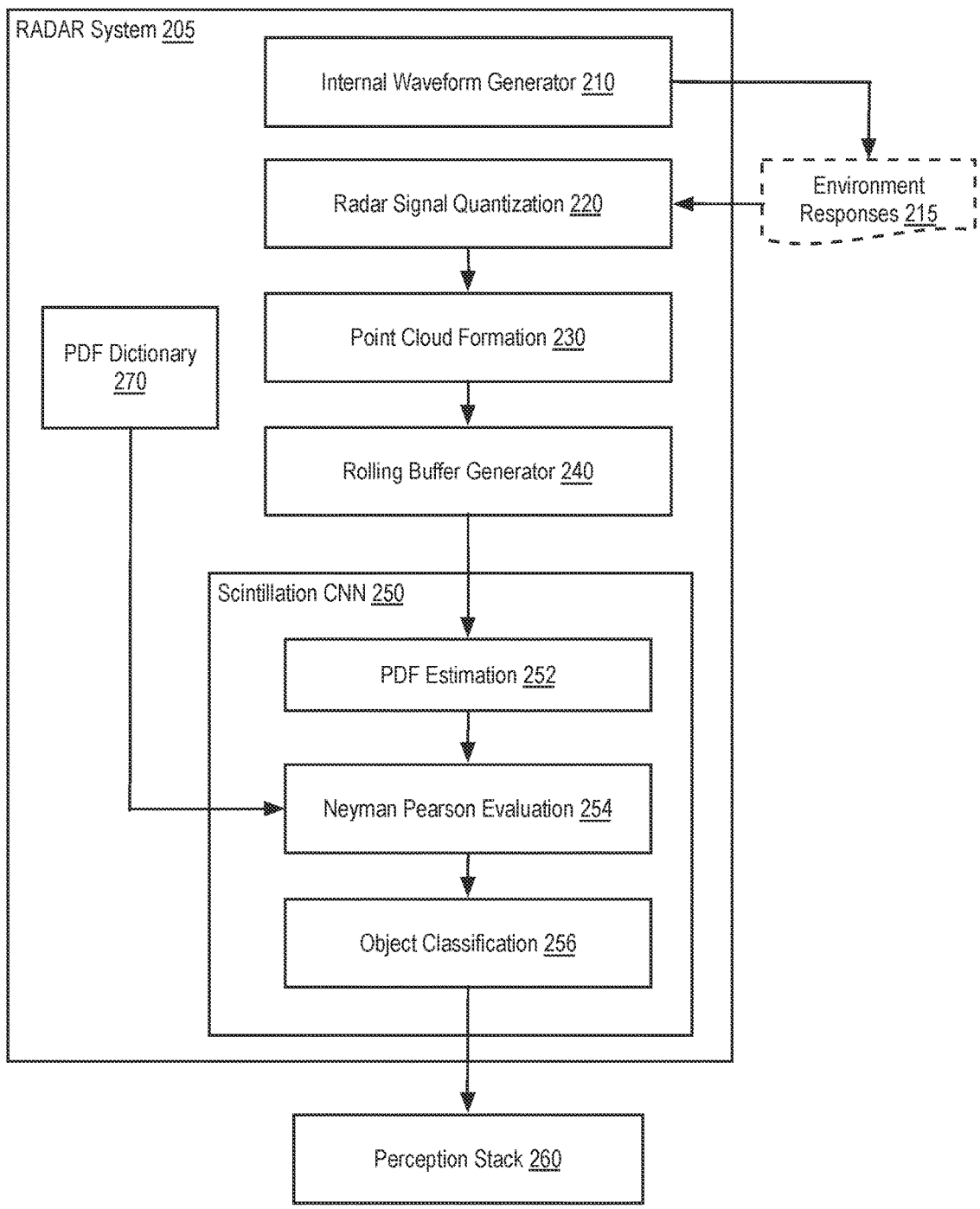
FIG. 2 illustrates a functional block diagram for a RADAR target classification system that provides operations for a scintillation-based neural network for RADAR target classification, in accordance with an embodiment herein.

FIG. 2 illustrates a functional block diagram for a RADAR target classification system 200 that provides operations for scintillation-based neural network for RADAR target classification, in accordance with an embodiment herein. In one embodiment, RADAR target classification system 200 is part of automotive RADAR system 100 described with respect to FIG. 1. In one embodiment, the RADAR target classification system 200 is implemented in a vehicle (e.g., an autonomous vehicle (AV), which in some embodiments is fully autonomous while in other embodiments is a driver-assisted vehicle, etc.).

In embodiments herein, the RADAR target classification system 200 may include a RADAR system 205. RADAR system 205 may include an internal waveform generator 210 to generate and transmit a RADAR signal. In one embodiment, the internal waveform generator 210 can generate predefined waveforms by driving the amplitudes and phase shifts of carried microwave signals. RADAR uses electromagnetic energy pulses as radio-frequency (RF) energy that is transmitted to and reflected from a reflecting object. A small portion of the reflected energy returns to the radar set as environment responses 215. This returned energy is called an echo. RADAR systems, such as RADAR system 205, use the echo to determine the direction and distance of the reflecting object. As such, environment responses 215 that are received at the RADAR system 205 provide data corresponding to the scene around the RADAR system 205. Such environment responses 215 may be referred to herein as received RF scene responses or received RADAR scene responses, for example. The environment responses 215 may then be down converted and digitized by the radar signal quantization 220 of the RADAR system 205.

The results of the down conversion and digitization can be used to create a point cloud of the RADAR data at point cloud formation 230. The point cloud is a set of data points in space. In some embodiments, RADAR point clouds are the result of the RADAR receiving a detected signal and providing the reflection points of that signal. In one example embodiment, a point of the RADAR point cloud data could be represented by four-dimensional points, where each point contains an (X, Y) coordinate, doppler velocity, and the RCS value. In some embodiments, RCS scintillation values may also be included in the radar point cloud data.

In some embodiments, the RADAR point cloud can be further processed to detect objects of interest in the RADAR point cloud and generate object point clouds that include reflection points that correspond to the objects of interest. These object point clouds may then be further processed for object classification using the classification technique of embodiments here as discussed below.

The generated point clouds (e.g., raw RADAR point cloud, object point cloud, etc.) are provided to the rolling buffer generator 240 in order to populate a rolling buffer generated and maintained by rolling buffer generator 240. In one embodiment, rolling buffer generator 240 is the same as rolling buffer agent 126 described with respect to FIG. 1. The rolling buffer generator 240 maintains a data store including a buffer data structure that stores N (where N is a value of one or more) frames of RADAR data corresponding to captured scene data of environment responses 215. The frames of RADAR data stored in the rolling buffer may be obtained from the generated point cloud(s) and can include, but are not limited to, a histogram of RCS values corresponding to objects in the captured scene data, as well as velocity values corresponding to the objects. In some embodiments, the frames of RADAR data stored in the rolling buffer can include RCS scintillation values as well.

The rolling buffer is then provided to a scintillation CNN 250. In one embodiment, scintillation CNN 250 is the same as classification agent 120 described with respect to FIG. 1. The scintillation CNN 250 can provide object classification for objects in the RADAR scene data. The scintillation CNN 250 can provide for machine learning classification. Further discussion of machine learning based classification techniques and neural network(s) can be found in FIG. 7 below and its associated description. A CNN is a type of deep neural network and includes an input layer and an output layer, with multiple hidden layers between the input and output layers. The hidden layers of a CNN include a series of convolutional, nonlinear, pooling (for down sampling), and fully connected layers. Embodiments herein may utilize other types of deep networks (deep neural networks) other than a CNN, such as an autoencoder, Deep Belief Nets (DBNs), Recurrent Neural Networks (RNNs), among others.

In one embodiment, the scintillation CNN 250 can utilize the RADAR data stored in the rolling buffer generated by the rolling buffer generator 240. For each object detected in the scene captured by the RADAR sensor, the scintillation CNN 250 can utilize the RCS scintillation values to generate a PDF estimate 252 of the RCS scintillation measurements.

The scintillation CNN 250 may then determine best fits of the PDF estimate 252 with one or more reference PDFs from a PDF dictionary 270 corresponding to the RADAR sensor. In one embodiment, the PDF dictionary 270 may be a data store maintaining one or more reference PDFs for the RADAR system 205. The reference PDFs may be generated during sensor design and/or validation of the RADAR system 205. In embodiments herein, determining a "best fit" can refer to selecting a reference PDF that is most similar to the PDF estimate 252. For example, if a line is drawn through each of the reference PDFs, the best fit is a line that minimizes the distance between another line drawn through the PDF estimate.

In one embodiment, the scintillation CNN 250 utilizes a Neyman-Pearson evaluation 254 to determine the best fits with the reference PDFs. The Neyman-Pearson evaluation 254 is a test to determine if a hypothesis test being used is the one with the greatest statistical power. The power of a hypothesis test is the probability that the test correctly rejects the null hypothesis when the alternate hypothesis is true. The goal would be to maximize this power, so that the null hypothesis is rejected as much as possible when the alternate is true.

With respect to determining best fits, due to the structural nature of the objects of interest, the responses from the objects can be significantly different from the responses from asphalt or floor noise. For example, pedestrians have an RCS distribution that resembles a Chi square with 2 degrees of freedom, static objects (such as posts or hydrants) have an RCS distribution that resembles Chi square distribution with no degrees of freedom, clutter has an RCS distribution that resembles Weibull style distributions, and thermal noise has an RCS distribution that follows a Gaussian distribution. As such, the Neyman Pearson evaluation 254 can be utilized to determine the best fit of the estimated PDF 252 with the distributions found in the PDF dictionary 270. The scintillation-based CNN 250 of embodiments herein further provides additional safeguards by incorporating the signature velocity of the objects captured by the RADAR sensor in order to compensate for scintillation effects due to motion (such as false positives exhibited by asphalt surfaces).

Subsequent to determining the fits for the estimated PDF via the Neyman-Pearson evaluation 254, the scintillation CNN 250 determines a classification 256 for the object based on best fit from the Neyman Pearson evaluation 254. The classifications 256 for the object may include, but are not limited to, targets of interest, highly reflective structures, clutter, or thermal noise, for example. The classification(s) can then be provided to a perception stack 260 (e.g., of the AV) for further processing.

Figure 3:
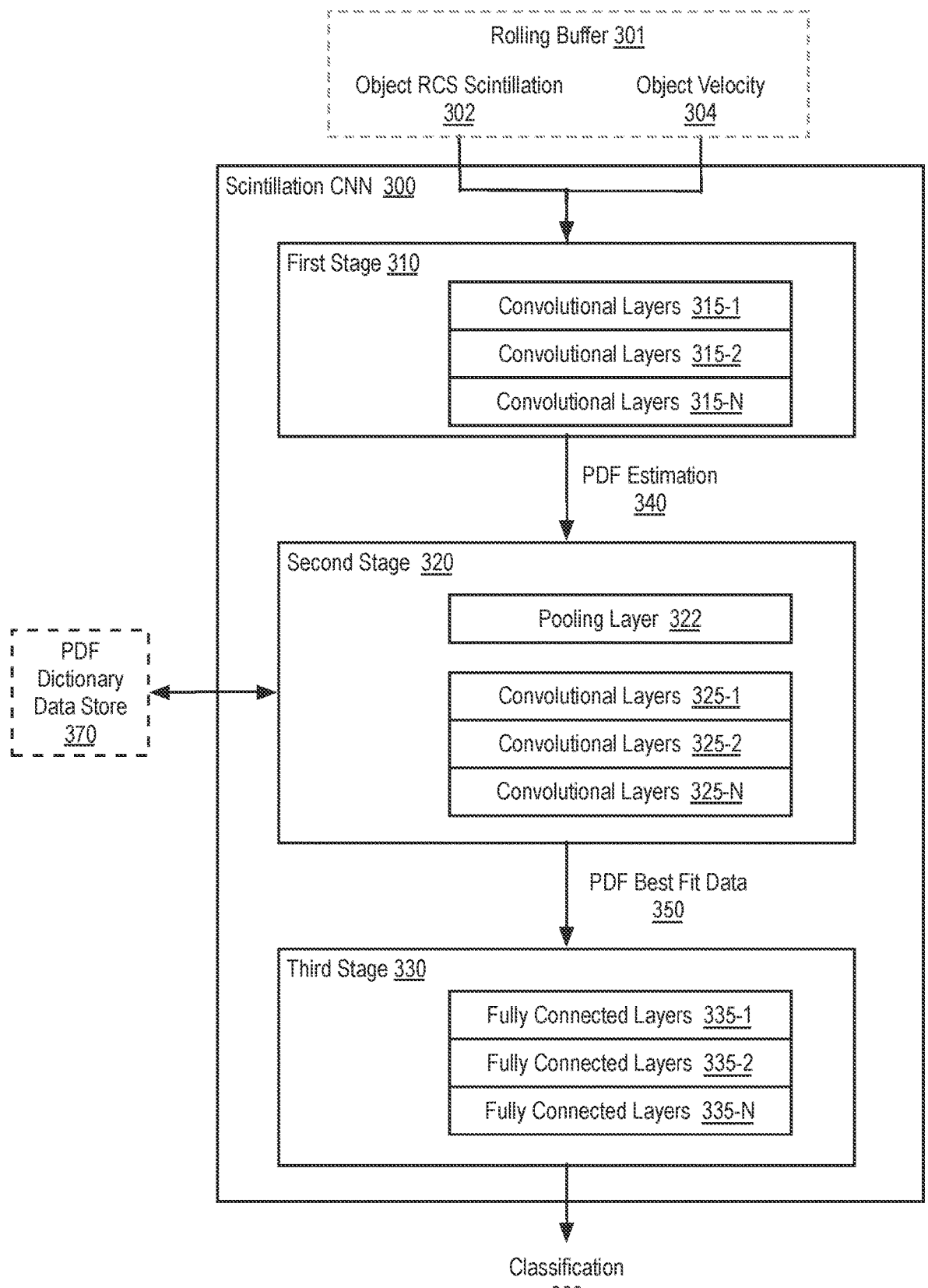
FIG. 3 is a functional block diagram for a scintillation convolutional neural network (CNN) providing RADAR target classification of objects of interest, in accordance with an embodiment herein.

FIG. 3 is a functional block diagram for a scintillation CNN 300 providing RADAR target classification of objects of interest, in accordance with an embodiment herein. In one embodiment, scintillation CNN 300 is the same as scintillation CNN 250 described with respect to FIG. 2.

In one embodiment, scintillation CNN 300 may be constructed of multiple stages, shown as the first stage 310, second stage 320, and third stage 330 in FIG. 3. The first stage 310 of the scintillation CNN 300 receives RCS scintillation measurements 302 for an object in a RADAR scene from a rolling buffer 301, and performs a PDF estimation for the object. This first stage 310 is formed by convolutional layers shown as convolutional layers 315-1, 315-2, through 315-N. The generated PDF estimation 340 is passed on to the second stage 320.

The second stage 320 of the scintillation CNN performs a Neyman-Pearson evaluation criteria to determine proper fit with one or more reference PDFs stored in a PDF dictionary data store 370. The second stage 320 also incorporates the velocity values 304 (from the rolling buffer 301) of the object in order to compensate for scintillation effects due to motion (such as false positives exhibited by asphalt surfaces). The input of the second stage 320 is formed by a pooling layer 322 followed by several convolutional layers, shown as convolutional layers 325-1, 325-2, through 325-N. The PDF best fit data 350 is then provided to the third stage 330 of the scintillation CNN 300.

The third stage 330 (also referred to as the final stage) can include a series of fully connected layers 335-1, 335-2, through 335-N to assess the likelihood of the different fits and determine a classification 360 of the type of each object within the scanned RADAR scene. In one embodiment, the categories for classification 360 can include, but are not limited to, target of interest, highly reflective structure (e.g., hydrant, post), clutter surface, or sensor noise.

As previously noted, the scintillation-based CNN (e.g., scintillation CNN 250, scintillation CNN 300) of embodiments herein provides for enhanced discrimination, as the basic features used for classification is based on physics-based first principles. As such, embodiments herein may provide a higher level of discrimination between objects of interest and environmental clutter. Furthermore, embodiments herein provide for contrast improvement as the CNN is using RCS scintillation instead of raw RCS values. As such, the CNN is capable of detecting low RCS targets in cluttered environments. This is of particular interest as several critical objects, such as small children, have RCS values within the same RCS magnitude as street surfaces and are closer to the floor noise levels of the sensor.

The scintillation-based CNN of embodiments herein also provides resilience against motion artifacts. This is due to the joint use of the RCS scintillation and velocity components for the object signatures in the scene. The embodiments described herein provide an additional level of resilience compared to current classification approaches that use velocity metrics. Furthermore, by using both velocity and RCS scintillation as the input metrics, the scintillation-based CNN described herein is capable of effectively eliminating velocity artifacts and compensate for the velocity effects on the object's scintillation.

One example of implementations herein is the classification of pedestrians versus smaller targets, such as different types of road debris. Both targets have low Radar Cross Section values, however pedestrian RCS signatures follow a Swerling-3 behavior as it consists of a major scatter (e.g., body trunk) and minor scatters (e.g., limbs). In contrast, debris follows a Swerling-1 distribution as it consist of smaller scatters, all of them with similar magnitude.

Figure 4:
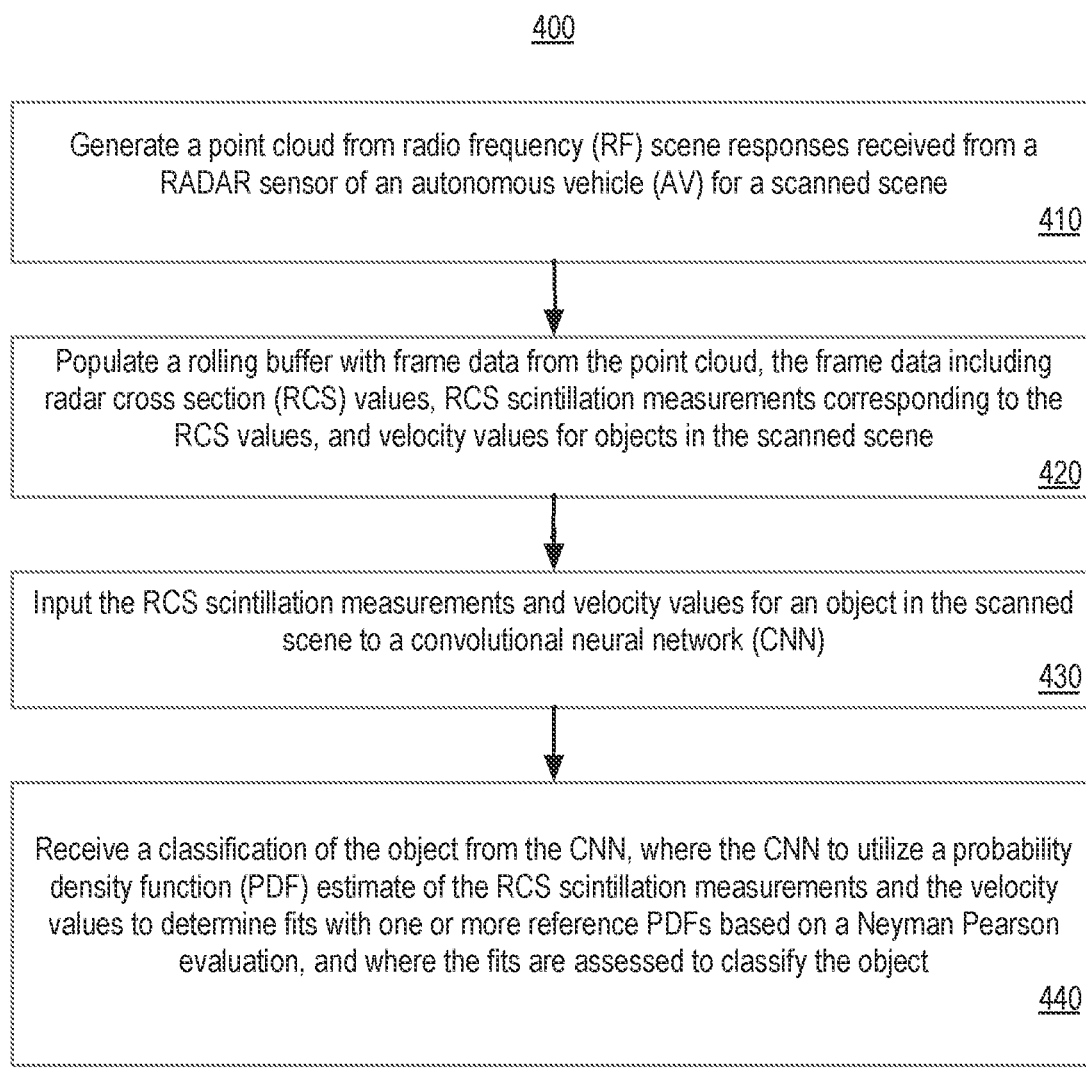
FIG. 4 illustrates an example method for scintillation-based neural network for RADAR target classification, in accordance with embodiments herein.

FIG. 4 illustrates an example method 400 for scintillation-based neural network for RADAR target classification, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a point cloud is generated from RF scene responses received from a RADAR sensor of an AV for a scanned scene. The point cloud is a set of data points in space. In some embodiments, radar point clouds are the result of the radar receiving a detected signal and providing the reflection points of that signal. In one example embodiment, the radar point could be represented by four-dimensional points, where each point contains an (X, Y) coordinate, doppler velocity, and the RCS value. In some embodiments, RCS scintillation values may also be included in the radar point cloud data.

Then, at block 420, a rolling buffer is populated with frame data from the point cloud. In one embodiment, the frame data can include RCS values, RCS scintillation measurements corresponding to the RCS values, and velocity values for objects in the scanned scene. Subsequently, at block 430, the RCS scintillation measurements and velocity values for an object in the scanned scene are inputted to a CNN. The CNN is a type of deep neural network and can include an input layer and an output layer, with multiple hidden layers between the input and output layers. In one embodiment, the CNN can provide for machine learning classification that provides object classification for objects in the radar scene data.

Lastly, at block 440, a classification of the object is received from the CNN. In one embodiment, the CNN can utilize a PDF estimate of the RCS scintillation measurements and the velocity values to determine fits with one or more reference PDFs based on a Neyman-Pearson evaluation. In one embodiment, the fits are assessed in order to classify the object. The object may be classified as one of a target of interest, a highly reflective structure, a clutter surface, or sensor noise, for example.

FIG. 5 illustrates an example method 500 for RADAR target classification by a scintillation-based CNN, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a scintillation-based CNN receives RCS scintillation measurements and velocity values for an object in a scanned region of a RADAR sensor. RCS, also referred to as RADAR signature, is a measure of how detectable an object is by a radar. RCS scintillation refers to a fluctuation in the amplitude of the RCS of a target object of the RADAR sensor. RCS scintillation can be caused by a shift of the effective reflection point on the target, but has other causes as well. The fluctuations can be slow (scan-to-scan) or rapid (pulse-to-pulse).

Then, at block 520, a first stage of the CNN generates a PDF estimate of the RCS scintillation measurements for the object in the scanned region. PDF, or density, of a continuous random variable, is a function whose value at any given sample (or point) in the sample space (the set of possible values taken by the random variable) can be interpreted as providing a relative likelihood that the value of the random variable would be close to that sample.

Subsequently, at block 530, a second stage of the CNN performs a Neyman Pearson evaluation of the PDF estimate for the object to determine fits with reference PDFs from a PDF dictionary utilized by the CNN. In one embodiment, the Neyman Pearson evaluation is to further utilize the velocity values to determine the fits. The Neyman-Pearson evaluation is a test to determine if a hypothesis test being used is the one with the greatest statistical power. The power of a hypothesis test is the probability that the test correctly rejects the null hypothesis when the alternate hypothesis is true. The goal would be to maximize this power, so that the null hypothesis is rejected as much as possible when the alternate is true.

Lastly, at block 540, a third stage of the CNN classifies the object based on an assessment of the determined fits from the second stage of the CNN. In one embodiment, the object is classified as one of a target of interest, a highly reflective structure, a clutter surface, or sensor noise.

Figure 6:
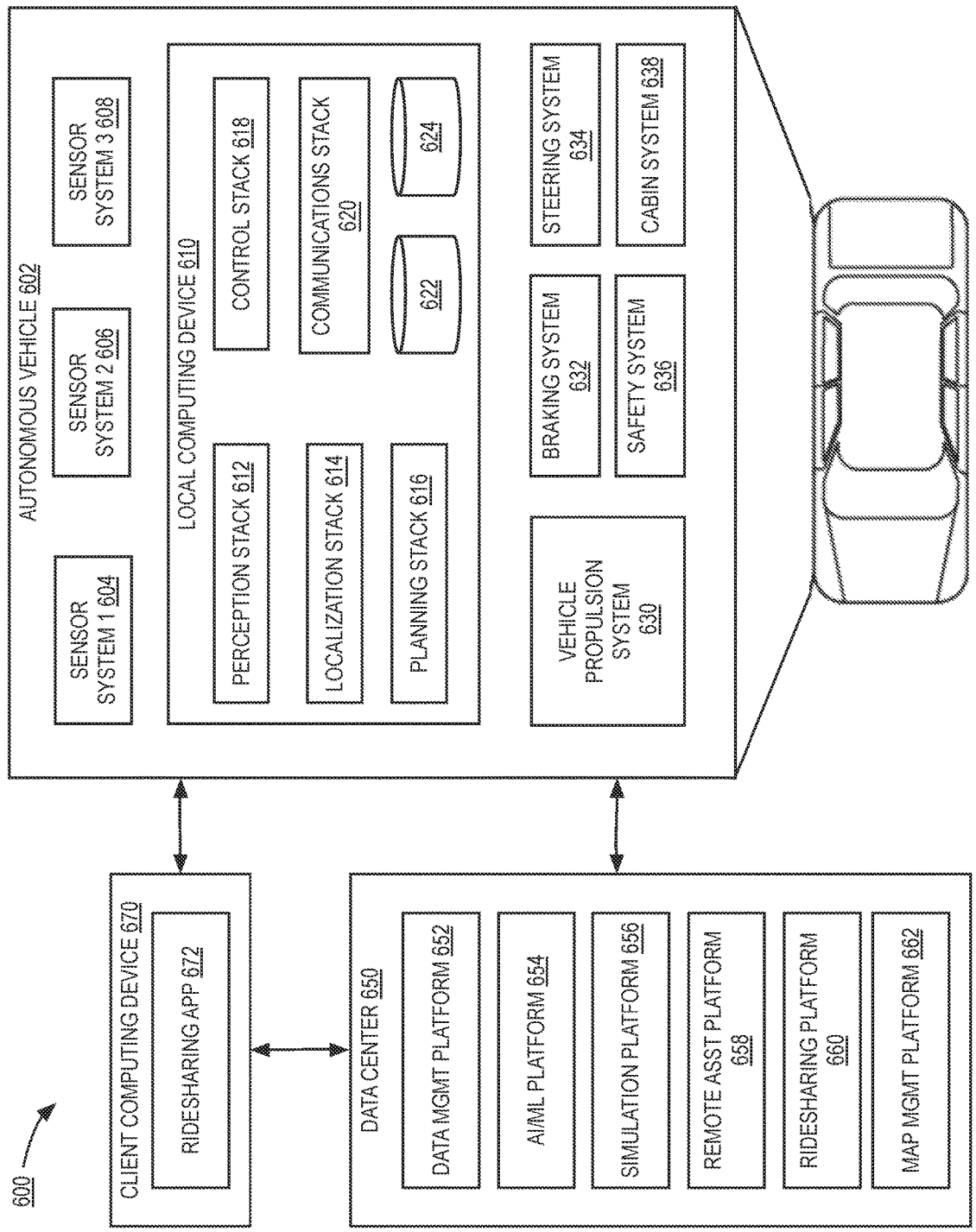
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. In one embodiment, the AV management system 600 can implement scintillation-based neural network for RADAR target classification, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
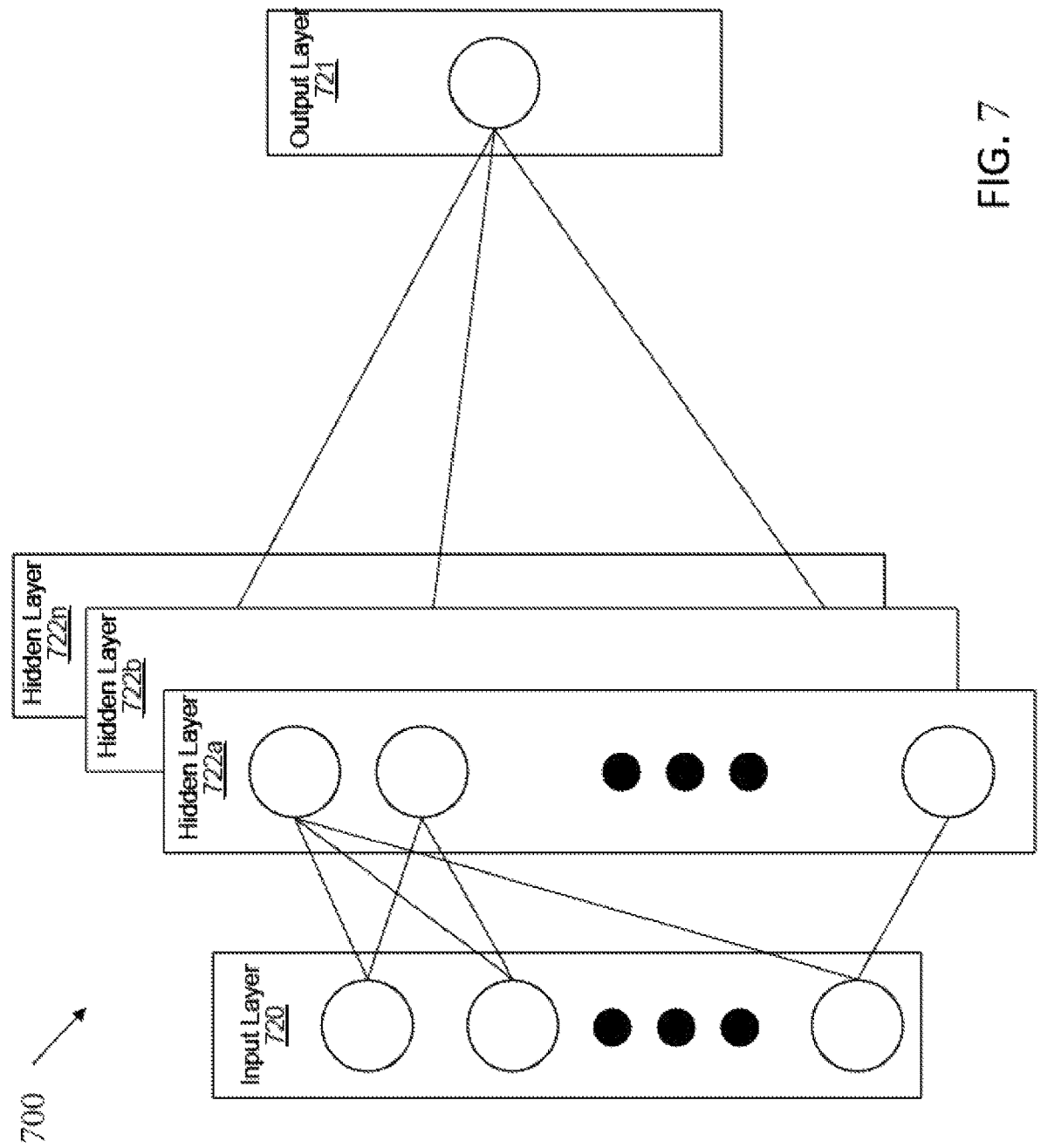
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 721 that provides an output resulting from the processing performed by the hidden layers 722a, 722b, through 722n. In one illustrative example, the output layer 721 can provide estimated treatment parameters, that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}((target-output)^2))$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
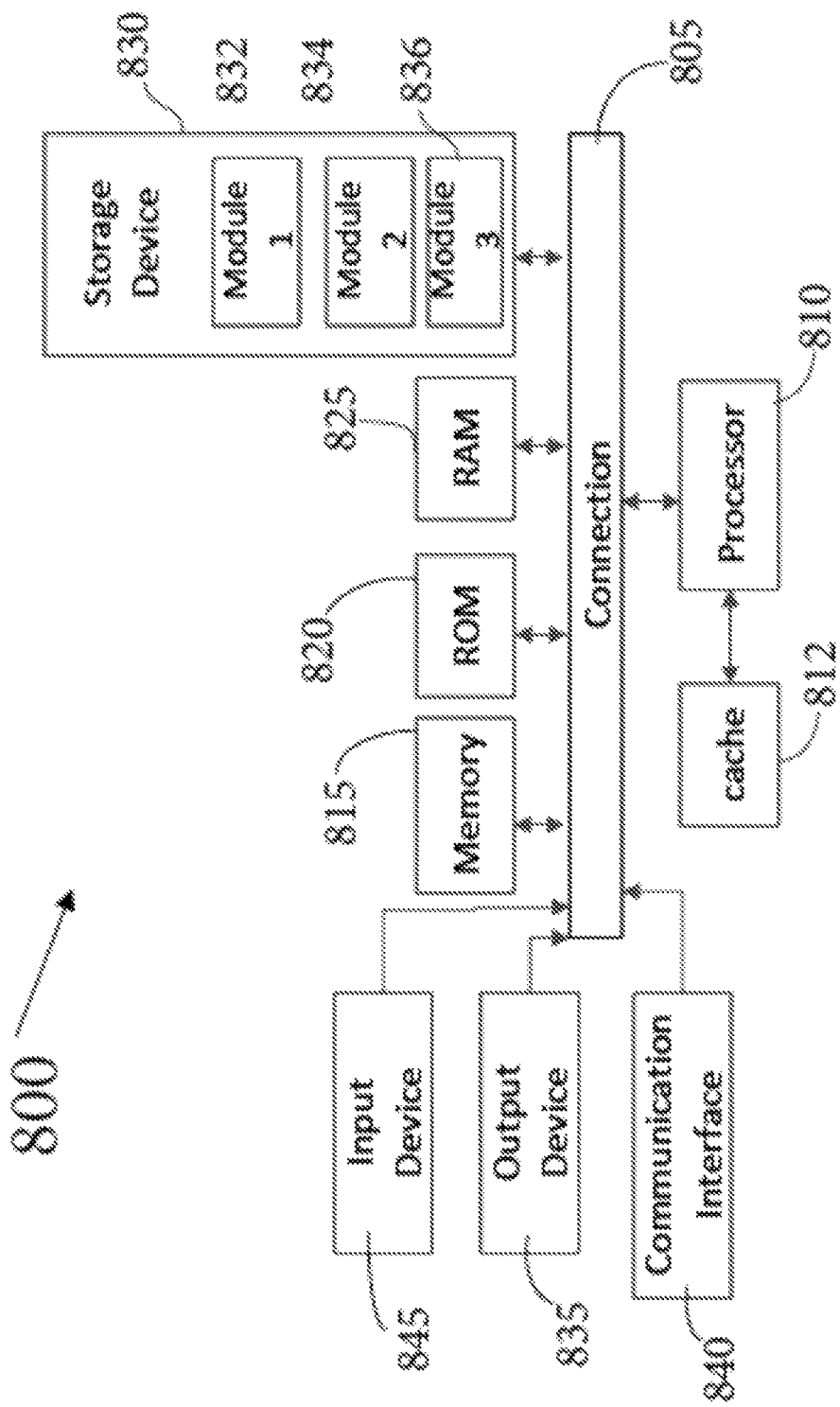
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a method for scintillation-based neural network for RADAR target classification, the method of Example 1 comprising: A method comprising: generating a point cloud from radio frequency (RF) scene responses received from a radio detection and ranging (RADAR) sensor for a scanned scene; populating a rolling buffer with frame data from the point cloud, the frame data including radar cross section (RCS) values, RCS scintillation measurements corresponding to the RCS values, and velocity values for objects in the scanned scene; inputting the RCS scintillation measurements and velocity values for an object of the objects in the scanned scene to a convolutional neural network (CNN); and receiving a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

In Example 2, the subject matter of Example 1 can optionally include further comprising: generating, at a first stage of the CNN, the PDF estimate of the RCS scintillation measurements for the object in the scanned scene; performing, at a second stage of the CNN, the Neyman-Pearson evaluation of the PDF estimate for the object to determine the fits with the reference PDFs, where the Neyman-Pearson evaluation is to utilize the velocity values to determine the fits; and classifying, at a third stage of the CNN, the object based on an assessment of the determined fits from the second stage of the CNN. In Example 3, the subject matter of any one of Examples 1-2 can optionally include wherein the reference PDFs are maintained in a PDF dictionary utilized by the CNN, and wherein the PDF dictionary generated during design and validation of the RADAR sensor.

In Example 4, the subject matter of any one of Examples 1-3 can optionally include wherein the first stage of the CNN comprises one or more convolutional layers. In Example 5, the subject matter of any one of Examples 1-4 can optionally include wherein the second stage of the CNN comprises a pooling layer and a plurality of convolutional layers. In Example 6, the subject matter of any one of Examples 1-5 can optionally include wherein the third stage of the CNN comprises a series of fully connected layers.

In Example 7, the subject matter of any one of Examples 1-6 can optionally include wherein the second stage of the CNN is to utilize the velocity values to eliminate velocity artifacts in the RCS scintillation measurements of the object and to compensate for velocity effects on the RCS scintillation measurements of the object. In Example 8, the subject matter of any one of Examples 1-7 can optionally include wherein the object is classified as one of a target of interest, a highly reflective structure, a clutter surface, or sensor noise.

In Example 9, the subject matter of any one of Examples 1-8 can optionally include wherein the rolling buffer comprises frame data from a plurality of frames captured for the scanned scene by the RADAR sensor. In Example 10, the subject matter of any one of Examples 1-9 can optionally include wherein the RADAR sensor is comprised in an autonomous vehicle (AV).

Example 11 includes an apparatus for scintillation-based neural network for RADAR target classification, the apparatus of Example 11 comprising one or more hardware processors to: generate a point cloud from radio frequency (RF) scene responses received from a radio detection and ranging (RADAR) sensor for a scanned scene; populate a rolling buffer with frame data from the point cloud, the frame data including radar cross section (RCS) values, RCS scintillation measurements corresponding to the RCS values, and velocity values for objects in the scanned scene; input the RCS scintillation measurements and velocity values for an object of the objects in the scanned scene to a convolutional neural network (CNN); and receive a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

In Example 12, the subject matter of Example 11 can optionally include wherein the one or more hardware processors are further to: generate, at a first stage of the CNN, the PDF estimate of the RCS scintillation measurements for the object in the scanned scene; perform, at a second stage of the CNN, the Neyman-Pearson evaluation of the PDF estimate for the object to determine the fits with the reference PDFs, where the Neyman-Pearson evaluation is to utilize the velocity values to determine the fits; and classify, at a third stage of the CNN, the object based on an assessment of the determined fits from the second stage of the CNN. In Example 13, the subject matter of Examples 11-12 can optionally include wherein the reference PDFs are maintained in a PDF dictionary utilized by the CNN, and wherein the PDF dictionary generated during design and validation of the RADAR sensor.

In Example 14, the subject matter of Examples 11-13 can optionally include wherein the first stage of the CNN comprises one or more convolutional layers; wherein the second stage of the CNN comprises a pooling layer and a plurality of convolutional layers; and wherein the third stage of the CNN comprises a series of fully connected layers. In Example 15, the subject matter of Examples 11-14 can optionally include wherein the second stage of the CNN is to utilize the velocity values to eliminate velocity artifacts in the RCS scintillation measurements of the object and to compensate for velocity effects on the RCS scintillation measurements of the object. In Example 16, the subject matter of Examples 11-15 can optionally include wherein the object is classified as one of a target of interest, a highly reflective structure, a clutter surface, or sensor noise.

Example 17 is a non-transitory computer-readable storage medium for facilitating scintillation-based neural network for RADAR target classification. The non-transitory computer-readable storage medium of Example 17 having stored thereon executable computer program instructions that, when executed by one or more processors, cause the one or more processors to: generate a point cloud from radio frequency (RF) scene responses received from a radio detection and ranging (RADAR) sensor for a scanned scene; populate a rolling buffer with frame data from the point cloud, the frame data including radar cross section (RCS) values, RCS scintillation measurements corresponding to the RCS values, and velocity values for objects in the scanned scene; input the RCS scintillation measurements and velocity values for an object of the objects in the scanned scene to a convolutional neural network (CNN); and receive a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

In Example 18, the subject matter of Example 17 can optionally include wherein the one or more processors are further to: generate, at a first stage of the CNN, the PDF estimate of the RCS scintillation measurements for the object in the scanned scene; perform, at a second stage of the CNN, the Neyman-Pearson evaluation of the PDF estimate for the object to determine the fits with the reference PDFs, where the Neyman-Pearson evaluation is to utilize the velocity values to determine the fits; and classify, at a third stage of the CNN, the object based on an assessment of the determined fits from the second stage of the CNN.

In Example 19, the subject matter of Examples 17-18 can optionally include wherein the first stage of the CNN comprises one or more convolutional layers; wherein the second stage of the CNN comprises a pooling layer and a plurality of convolutional layers; and wherein the third stage of the CNN comprises a series of fully connected layers. In Example 20, the subject matter of Examples 17-19 can optionally include wherein the second stage of the CNN is to utilize the velocity values to eliminate velocity artifacts in the RCS scintillation measurements of the object and to compensate for velocity effects on the RCS scintillation measurements of the object.

Example 21 is a system for facilitating scintillation-based neural network for RADAR target classification. The system of Example 21 can optionally include a memory to store a block of data, and a processor communicably coupled to the memory, wherein the processor is to: generate a point cloud from radio frequency (RF) scene responses received from a radio detection and ranging (RADAR) sensor for a scanned scene; populate a rolling buffer with frame data from the point cloud, the frame data including radar cross section (RCS) values, RCS scintillation measurements corresponding to the RCS values, and velocity values for objects in the scanned scene; input the RCS scintillation measurements and velocity values for an object of the objects in the scanned scene to a convolutional neural network (CNN); and receive a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

In Example 22, the subject matter of Example 21 can optionally include wherein the one or more hardware processors are further to: generate, at a first stage of the CNN, the PDF estimate of the RCS scintillation measurements for the object in the scanned scene; perform, at a second stage of the CNN, the Neyman-Pearson evaluation of the PDF estimate for the object to determine the fits with the reference PDFs, where the Neyman-Pearson evaluation is to utilize the velocity values to determine the fits; and classify, at a third stage of the CNN, the object based on an assessment of the determined fits from the second stage of the CNN. In Example 23, the subject matter of Examples 21-22 can optionally include wherein the reference PDFs are maintained in a PDF dictionary utilized by the CNN, and wherein the PDF dictionary generated during design and validation of the RADAR sensor.

In Example 24, the subject matter of Examples 21-23 can optionally include wherein the first stage of the CNN comprises one or more convolutional layers; wherein the second stage of the CNN comprises a pooling layer and a plurality of convolutional layers; and wherein the third stage of the CNN comprises a series of fully connected layers. In Example 25, the subject matter of Examples 21-24 can optionally include wherein the second stage of the CNN is to utilize the velocity values to eliminate velocity artifacts in the RCS scintillation measurements of the object and to compensate for velocity effects on the RCS scintillation measurements of the object. In Example 26, the subject matter of Examples 21-25 can optionally include wherein the object is classified as one of a target of interest, a highly reflective structure, a clutter surface, or sensor noise.

Example 27 includes an apparatus comprising means for performing the method of any of the Examples 1-10. Example 28 is at least one machine readable medium comprising a plurality of instructions that in response to being executed on a computing device, cause the computing device to carry out a method according to any one of Examples 1-10. Example 29 is an apparatus for facilitating scintillation-based neural network for RADAR target classification, configured to perform the method of any one of Examples 1-10. Specifics in the Examples may be used anywhere in one or more embodiments.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
generating a point cloud from radio frequency (RF) scene responses received from a radio detection and ranging (RADAR) sensor for a scanned scene;
populating a rolling buffer with frame data from the point cloud, the frame data including radar cross section (RCS) values, RCS scintillation measurements corresponding to the RCS values, and velocity values for objects in the scanned scene;
inputting the RCS scintillation measurements and velocity values for an object of the objects in the scanned scene to a convolutional neural network (CNN); and
receiving a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

2. The method of claim 1, further comprising:
generating, at a first stage of the CNN, the PDF estimate of the RCS scintillation measurements for the object in the scanned scene;
performing, at a second stage of the CNN, the Neyman-Pearson evaluation of the PDF estimate for the object to determine the fits with the reference PDFs, where the Neyman-Pearson evaluation is to utilize the velocity values to determine the fits; and
classifying, at a third stage of the CNN, the object based on an assessment of the determined fits from the second stage of the CNN.

3. The method of claim 2, wherein the reference PDFs are maintained in a PDF dictionary utilized by the CNN, and wherein the PDF dictionary generated during design and validation of the RADAR sensor.

4. The method of claim 2, wherein the first stage of the CNN comprises one or more convolutional layers.

5. The method of claim 2, wherein the second stage of the CNN comprises a pooling layer and a plurality of convolutional layers.

6. The method of claim 2, wherein the third stage of the CNN comprises a series of fully connected layers.

7. The method of claim 2, wherein the second stage of the CNN is to utilize the velocity values to eliminate velocity artifacts in the RCS scintillation measurements of the object and to compensate for velocity effects on the RCS scintillation measurements of the object.

8. The method of claim 1, wherein the object is classified as one of a target of interest, a highly reflective structure, a clutter surface, or sensor noise.

9. The method of claim 1, wherein the rolling buffer comprises frame data from a plurality of frames captured for the scanned scene by the RADAR sensor.

10. The method of claim 1, wherein the RADAR sensor is comprised in an autonomous vehicle (AV).

11. An apparatus comprising:
one or more hardware processors to:
generate a point cloud from radio frequency (RF) scene responses received from a radio detection and ranging (RADAR) sensor for a scanned scene;
populate a rolling buffer with frame data from the point cloud, the frame data including radar cross section (RCS) values, RCS scintillation measurements corresponding to the RCS values, and velocity values for objects in the scanned scene;
input the RCS scintillation measurements and velocity values for an object of the objects in the scanned scene to a convolutional neural network (CNN); and
receive a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

12. The apparatus of claim 11, wherein the one or more hardware processors are further to:
generate, at a first stage of the CNN, the PDF estimate of the RCS scintillation measurements for the object in the scanned scene;
perform, at a second stage of the CNN, the Neyman-Pearson evaluation of the PDF estimate for the object to determine the fits with the reference PDFs, where the Neyman-Pearson evaluation is to utilize the velocity values to determine the fits; and classify, at a third stage of the CNN, the object based on an assessment of the determined fits from the second stage of the CNN.

13. The apparatus of claim 12, wherein the reference PDFs are maintained in a PDF dictionary utilized by the CNN, and wherein the PDF dictionary generated during design and validation of the RADAR sensor.

14. The apparatus of claim 12, wherein the first stage of the CNN comprises one or more convolutional layers; wherein the second stage of the CNN comprises a pooling layer and a plurality of convolutional layers; and wherein the third stage of the CNN comprises a series of fully connected layers.

15. The apparatus of claim 12, wherein the second stage of the CNN is to utilize the velocity values to eliminate velocity artifacts in the RCS scintillation measurements of the object and to compensate for velocity effects on the RCS scintillation measurements of the object.

16. The apparatus of claim 11, wherein the object is classified as one of a target of interest, a highly reflective structure, a clutter surface, or sensor noise.

17. A non-transitory computer-readable medium having stored thereon instructions that, when executed by one or more processors, cause the one or more processors to:
generate a point cloud from radio frequency (RF) scene responses received from a radio detection and ranging (RADAR) sensor for a scanned scene;
populate a rolling buffer with frame data from the point cloud, the frame data including radar cross section (RCS) values, RCS scintillation measurements corresponding to the RCS values, and velocity values for objects in the scanned scene;
input the RCS scintillation measurements and velocity values for an object of the objects in the scanned scene to a convolutional neural network (CNN); and
receive a classification of the object from the CNN, wherein the CNN is to utilize a probability density function (PDF) estimate of the RCS scintillation measurements and the velocity values to determine fits with one or more reference PDFs based on a Neyman-Pearson evaluation, and wherein the fits are assessed to classify the object.

18. The non-transitory computer-readable medium of claim 17, wherein the one or more processors are further to:
generate, at a first stage of the CNN, the PDF estimate of the RCS scintillation measurements for the object in the scanned scene;
perform, at a second stage of the CNN, the Neyman-Pearson evaluation of the PDF estimate for the object to determine the fits with the reference PDFs, where the Neyman-Pearson evaluation is to utilize the velocity values to determine the fits; and
classify, at a third stage of the CNN, the object based on an assessment of the determined fits from the second stage of the CNN.

19. The non-transitory computer-readable medium of claim 18, wherein the first stage of the CNN comprises one or more convolutional layers; wherein the second stage of the CNN comprises a pooling layer and a plurality of convolutional layers; and wherein the third stage of the CNN comprises a series of fully connected layers.

20. The non-transitory computer-readable medium of claim 18, wherein the second stage of the CNN is to utilize the velocity values to eliminate velocity artifacts in the RCS scintillation measurements of the object and to compensate for velocity effects on the RCS scintillation measurements of the object.

* * * * *